US012476368B2

(12) United States Patent
Song et al.

(10) Patent No.: US 12,476,368 B2
(45) Date of Patent: Nov. 18, 2025

(54) ANTENNA, WIRELESS SIGNAL PROCESSING DEVICE, AND UNMANNED AERIAL VEHICLE

(71) Applicant: AUTEL ROBOTICS CO., LTD., Shenzhen (CN)

(72) Inventors: Jianping Song, Shenzhen (CN); Jianlei Wang, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 251 days.

(21) Appl. No.: 18/373,109

(22) Filed: Sep. 26, 2023

(65) Prior Publication Data

US 2024/0030605 A1 Jan. 25, 2024

Related U.S. Application Data

(63) Continuation of application No. PCT/CN2022/079360, filed on Mar. 4, 2022.

(30) Foreign Application Priority Data

Mar. 26, 2021 (CN) ......................... 202110326420.9

(51) Int. Cl.
*H01Q 5/48* (2015.01)
*H01Q 9/04* (2006.01)

(52) U.S. Cl.
CPC ............... *H01Q 5/48* (2015.01); *H01Q 9/045* (2013.01)

(58) Field of Classification Search
CPC .......... H01Q 5/48; H01Q 9/045; H01Q 5/378; H01Q 9/285
See application file for complete search history.

(56) References Cited

U.S. PATENT DOCUMENTS 7,369,094 B2 * 5/2008 Song ........................ H01Q 1/38 343/810
2004/0056805 A1 * 3/2004 Chen ........................ H01Q 1/38 343/795

(Continued)

FOREIGN PATENT DOCUMENTS

CN 203850420 A 9/2014
CN 108513687 A 9/2018

(Continued)

OTHER PUBLICATIONS

Supplementary European Search Report issued in EP Application No. 22774025.5 dated Aug. 21, 2024, (10p).

(Continued)

*Primary Examiner* — Dieu Hien T Duong
(74) *Attorney, Agent, or Firm* — Arch & Lake LLP; Hao Tan; Shen Wang

(57) ABSTRACT

The present disclosure provides an antenna, a wireless signal processing device, and an unmanned aerial vehicle. The antenna includes: a substrate having a first surface and a second surface opposite the first surface; a first radiator and a second radiator disposed on the first surface, the first radiator and the second radiator facing opposite each other, the first radiator being located at one end near a head of the substrate, and the second radiator being located at one end near a root of the substrate; a third radiator disposed on the second surface, the third radiator being mirror symmetric with a portion of a structure of the first radiator and conducting with the second radiator, so that the first radiator, the second radiator and the third radiator form a coupled resonance point; and a feed line connected with the first radiator, the second radiator and the third radiator.

18 Claims, 7 Drawing Sheets

(56) References Cited

U.S. PATENT DOCUMENTS

| | | | | |
|---|---|---|---|---|
| 2005/0073465 A1* | 4/2005 | Olson | .................... | H01Q 21/08 343/700 MS |
| 2010/0141545 A1* | 6/2010 | Pakosz | ..................... | H01Q 5/48 343/810 |
| 2010/0259451 A1 | 10/2010 | Chang et al. | | |
| 2019/0115652 A1 | 4/2019 | Yun et al. | | |

FOREIGN PATENT DOCUMENTS

| | | |
|---|---|---|
| CN | 110808452 A | 2/2020 |
| CN | 110931965 A | 3/2020 |
| CN | 211126036 U | 7/2020 |
| CN | 112531352 A | 3/2021 |
| CN | 112886215 A | 6/2021 |
| WO | 2016138763 A1 | 9/2016 |

OTHER PUBLICATIONS

The First CNOA issued in CN Application: 2021103264209 dated Nov. 30, 2024 with English Translation, (12p).

The International Search Report issued in Application NP.: PCT/CN2022/079360 with dated Apr. 28, 2022, with English translation,(4p).

* cited by examiner

ANTENNA, WIRELESS SIGNAL PROCESSING DEVICE, AND UNMANNED AERIAL VEHICLE

CROSS REFERENCE TO RELATED DISCLOSURE

This application is a continuation application of International Patent Application No. PCT/CN2022/079360 filed on Mar. 4, 2022, which is based upon and claims priority to Chinese patent Application No. 2021103264209 filed on Mar. 26, 2021, both of which are incorporated herein in their entirety by reference for all purposes.

BACKGROUND

The antenna is a key component for transmitting and receiving electromagnetic wave wireless signals. Its performance has a significant impact on the unmanned aerial vehicle and other devices that need long-range wireless data transmission. With the continuous development of electronic information technology, the demand of wireless transmission for the number of coverage frequency bands and bandwidth is increasing. This presents a major challenge to the structural design of the antenna.

To meet higher and higher bandwidth requirements, complex structural designs are often required to achieve larger bandwidths. However, the complicated structure of the antenna makes the volume of the antenna unable to be controlled effectively, making it difficult to realize miniaturization, and making it difficult to apply to small products sensitive to the size and structure, such as unmanned aerial vehicles and remote controllers.

SUMMARY

Embodiments of the present disclosure relate to the field of antenna structure technology, and more particularly, to an antenna, a wireless signal processing device, and an unmanned aerial vehicle.

The embodiments of the present disclosure aim to provide an antenna, a wireless signal processing device and an unmanned aerial vehicle, which can solve the problems of complicated structure and difficult miniaturization of existing large-bandwidth antennas.

In order to solve the above-mentioned technical problem, according to a first aspect, an embodiment of the present disclosure provide the following technical solutions: an antenna. The antenna includes:

- a substrate having a first surface and a second surface opposite the first surface;
- a first radiator and a second radiator disposed on the first surface, the first radiator and the second radiator facing opposite each other, the first radiator being located at one end near a head of the substrate, and the second radiator being located at one end near a root of the substrate;
- a third radiator disposed on the second surface, the third radiator being mirror symmetric with a portion of a structure of the first radiator and conducting with the second radiator, so that the first radiator, the second radiator and the third radiator form a coupled resonance point; and a feed line connected with the first radiator, the second radiator and the third radiator.

In order to solve the above-mentioned technical problem, according to a second aspect, an embodiment of the present disclosure further provides the following technical solution: a wireless signal processing device. The wireless signal processing device includes: the antenna as described above for transmitting or receiving a wireless signal; a reception passage for parsing a wireless signal received by the antenna so as to acquire information content contained in the wireless signal; a transmission passage for loading the information content into a radio frequency carrier signal, forming a wireless signal and transmitting the wireless signal via the antenna.

In order to solve the above-mentioned technical problem, according to a third aspect, an embodiment of the present disclosure further provides the following technical solution: an unmanned aerial vehicle. The unmanned aerial vehicle includes: a fuselage having a landing gear thereon; a motor mounted at a connection of the fuselage and the landing gear for providing flight power for the unmanned aerial vehicle; and the antenna as described above, mounted within the landing gear.

The antenna of the embodiment of the present disclosure adopts a reasonable wiring and structural design, and uses the first radiator, the second radiator and the third radiator respectively located on two sides of the substrate to constitute a coupled resonance point, so that a larger bandwidth can be realized on a substrate with a smaller volume, and the defect that it is difficult for an antenna with a large bandwidth to be miniaturized is overcome.

BRIEF DESCRIPTION OF THE DRAWINGS

One or more embodiments are illustrated by way of example, and not by way of limitation on the embodiments, via figures in the corresponding accompanying drawings, in which elements having the same reference numeral designations represent similar elements, and in which the figures in the accompanying drawings are not to scale unless otherwise specified.

DETAILED DESCRIPTION

Figure 1:
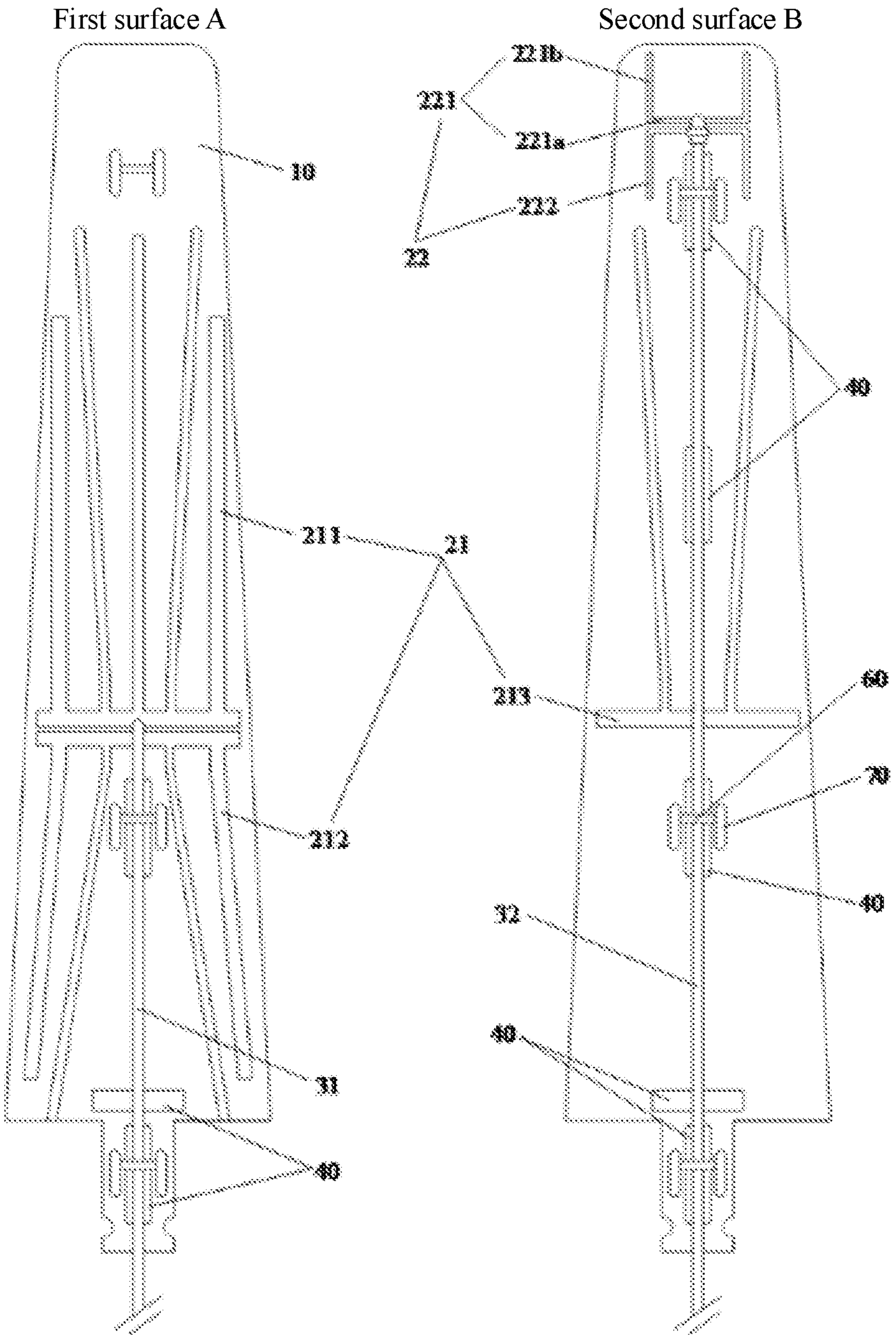
FIG. 1 is a schematic structural diagram of an antenna according to an embodiment of the present disclosure.

In order to facilitate an understanding of the present disclosure, a more detailed description of the disclosure is provided below in connection with the accompanying drawings and specific embodiments. It will be understood that when an element is referred to as being "fixed" to another element, it can be directly on the other element or intervening elements may be present. When an element is referred to as being "connected" to another element, it can be directly connected to the other element or intervening elements may be present. In the description, the orientation or positional relationship indicated by the terms "upper", "lower", "inner", "outer", "bottom", etc. is based on the orientation or positional relationship shown in the drawings, merely to facilitate the description of the present disclosure and simplify the description, and does not indicate or imply that the devices or elements referred to must have a particular orientation, be constructed and operated in a particular orientation, and thus should not be construed as limiting the present disclosure. Furthermore, the terms "first", "second", "third", and the like are used for descriptive purposes only and are not to be construed as indicating or implying relative importance; the radiator may also be referred to as vibrator or oscillator.

Unless otherwise defined, all technical and scientific terms used herein have the same meaning as commonly understood by one of ordinary skill in the art to which the present disclosure belongs. The terminology used in the description of the present disclosure herein is for the purpose of describing particular embodiments only and is not intended to be limiting of the disclosure. As used herein, the term "and/or" includes any and all combinations of one or more of the associated listed items.

Furthermore, the features of the various embodiments of the present disclosure described below can be combined as long as they do not conflict with each other.

FIG. 1 is a schematic structural diagram of an antenna according to an embodiment of the present disclosure. In the present embodiment, the front surface of the antenna is referred to as a "first surface A" while the back surface thereof is referred to as a "second surface B" for convenience of presentation. The "first" and "second" are only used to distinguish a front side from a back side of the substrate 10 and are not used to define a surface.

As shown in FIG. 1, the antenna mainly includes a substrate 10 as a base of an antenna structure, radiators (211, 212, 213, 221, 222) having a specific structural shape disposed on the first surface A and the second surface B of the substrate, and feed lines (31, 32) connected with the radiators.

Among other things, the substrate 10 may be a non-conductive structure fabricated from any type of material (e.g. plastic, foam) and having a particular shape (e.g. trapezoidal). It has a relatively flat shape, forming a flat first surface and a second surface.

The radiator is a conductor (e.g. copper foil) having a specific shape and length disposed on a surface of the substrate. It can be fixed on the surface of the substrate by any suitable form (such as patch type), and exposed to the outside, so as to realize the reception or transmission of wireless signals in a specific frequency band through the principle of electromagnetic induction.

One or more of the radiators may form a resonant cell for receiving or transmitting wireless signals in a specific frequency band. In the present embodiment, such a resonance unit may be referred to as a "radiation portion". In a multi-frequency antenna, it is generally possible to have a plurality of radiation portions, each for covering or corresponding to a different frequency band.

In some embodiments, the substrate 10 may be disposed with a first radiator 211, a second radiator 212 and a third radiator 213 constituting a first radiation portion 21 corresponding to a first frequency band.

Therein, the first radiator 211 and the second radiator 212 are disposed on the first surface A, and are facing opposite each other. In particular, as shown in FIG. 1, the first radiator 211 is oriented in a direction opposite to a direction of extension of the feed line and the second radiator 212 is oriented in the same direction as the direction of extension of the feed line.

In addition, the second radiator 212 is located closer to a root of the substrate (i.e. an end through which the feed line leaves the substrate) than the first radiator 211. In other words, the first radiator 211 is located closer to a head of the substrate. In this embodiment, for simplicity of presentation, an end near the direction of extension of the feed line is referred to as the "root of the substrate", and an end away from the direction of extension of the feed line is referred to as a "head of the substrate".

The third radiator 213 is a radiator disposed on the back side (i.e. the second surface B) of the substrate. The third radiator 213 has a same structural form as a part of the first radiator 211. It has a "mirror symmetry" relationship with the structure of the first radiator 211.

The mirror-image symmetry may also be referred to as mirror symmetry, meaning that the radiator structures at two opposite surfaces of the substrate is symmetrical with respect to the plane of the substrate. In other words, the third radiator 213 may be regarded as a radiator structure formed after a part of the radiator structure in the first radiator 211 is horizontally inverted to the second surface B.

In addition, the third radiator 213 is also in communication or conduction with the second radiator 212. In other words, the third radiator 213 and the second radiator 212 belong to the same passage. In particular, the third radiator 213 on the back side of the substrate 10 can pass through the substrate to establish a connection with the second radiator 212 on the front side of the substrate 10 (as a communicating wire) in any suitable manner.

In this embodiment, the space of the substrate is fully utilized, and the first radiator, the second radiator and the third radiator can constitute a coupled resonance point by the above-mentioned routing arrangement of the reasonable antenna structure, so that the bandwidth of the first radiation portion is greatly improved, and the antenna can achieve structural miniaturization while meeting the use requirements of a larger bandwidth.

Thus, a person skilled in the art would have been able to adjust one or more of an effective length, radiator shape or other similar radiator parameters of the first radiator 211, the second radiator 212 and the third radiator 213 as required by the actual situation (such as the frequency band corresponding to the first radiation portion). All the adjustments, changes or substitutions made to the present application in order to realize that the first radiator 211, the second radiator 212 and the third radiator 213 are coupled with each other and constitute a coupled resonance point fall within the scope of protection of the present application.

As will be appreciated by those skilled in the art, the length of the radiator (which may also be referred to as dimensional length or effective length) is an important dimensional parameter in the antenna and is closely related to the frequency band at which the wireless signal is received or transmitted.

In a preferred embodiment, the first radiator 211 may have an effective length slightly greater than an effective length of second radiator 212. The expression "slightly greater than" means that the difference between the two is less than a certain threshold or within a smaller range of values. In other words, the difference between the effective length of the first radiator 211 and the effective length of the second radiator 212 is in the range of zero to a preset length threshold.

The predetermined length threshold indicates a degree of difference between the effective lengths of the first radiator 211 and the second radiator 212. The length threshold is an empirical value that can be selectively set by a person skilled in the art as required by the actual situation to achieve the effect that the effective length of the first radiator 211 is slightly greater than the effective length of the second radiator 212.

Figure 2:
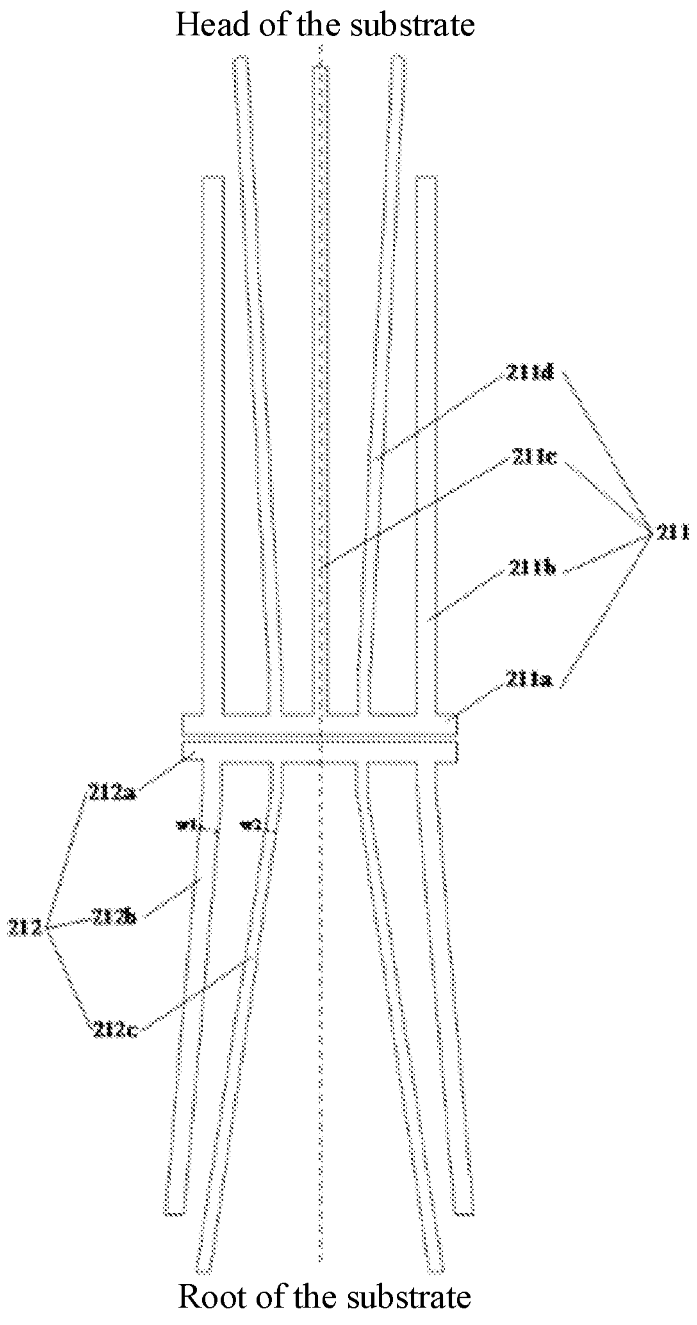
FIG. 2 is a schematic structural diagram of a first radiator and a second radiator according to an embodiment of the present disclosure.

FIG. 2 is a schematic structural diagram of the first radiator 211 and the second radiator 212 according to an embodiment of the present disclosure. In carrying out the present application, it has surprisingly been found that good antenna performance can be achieved with a relatively small volume using the radiator structure shown in FIG. 2.

The first radiator 211 and the second radiator 212 are symmetrically disposed along the axial direction of the substrate 40. In other words, the structures of the first radiator 211 and the second radiator 212 on both sides of the axis of the substrate are symmetrical.

As shown in FIG. 2, the first radiator 211 may include: a first radiator main body 211*a*, a first radiator arm 211*b*, a first microstrip line 211*c* and a pair of second microstrip lines 211*d*.

Here, the first radiator body 211*a* is a conductor structure of the microstrip line or the like having a predetermined length extending along a radial direction of the substrate, while the radial direction refers to a direction perpendicular to the axial direction of the substrate. The predetermined length is an empirical value and can be set by the person skilled in the art as required by the actual situation.

The first radiator arms 211*b* are provided in a pair, respectively located at two ends of the first radiator body 211*a*, and are symmetrical along the axis of the substrate. A direction of extension of the first radiator arms 211*b* is in the axial direction and extends a certain length toward the head of the substrate.

The first microstrip line 211*c* is similar to the first radiator arms 211*b*, and likewise extends a certain length from the first radiator body in the axial direction. The difference is that the position thereof is located on a symmetry axis (namely, the axis of the substrate) of the first radiator, and overlaps the symmetry axis. In other words, the first microstrip line 211*c* is located between the first radiator arms 211*b* on both sides and has a length greater than a length of the first radiator arms 211*b*, so as to be combined with the first radiator arms 211*b* and the radiator body 211*a* into a radiator shape similar to a "山" shape.

Further, the pair of second microstrip lines 211*d* are also provided in a pair at positions on both sides of the axis of the substrate between the first microstrip line 211*c* and the first radiator arms 211*b*. The pair of second microstrip lines 211*d* also communicate with the first radiator body 211*a* and have a large length than the first microstrip line 211*c*, thus forming a complete first radiator structure.

Specifically, the pair of second microstrip lines 211*d* may have an inclination extending from the radiator body 211*a* to a length greater than a length of the first microstrip line 211*c*.

In some embodiments, as shown in FIG. 1, the third radiator disposed on the second surface B may have a radiator structure similar to a "π" pattern, in a mirror symmetric relationship with the radiator structure composed of the first radiator body 211*a* of the first radiator disposed on the first surface A and a pair of third microstrip lines 211*c*.

With continued reference to FIG. 2, the second radiator 212 may be generally divided into: a second radiator body 212*a*, a pair of second radiator arms 212*b*, a third microstrip line 212*c*, etc.

The second radiator body 212*a* has a predetermined length extending in the radial direction of the substrate similar to the first radiator body 211*a*.

The pair of second radiator arms 212*b* are also provided in a pair, and are formed by extending a certain length in the axial direction of the substrate at positions near two ends of the second radiator body, respectively.

The third microstrip line 212*c* is disposed between the pair of second radiator arms 212*b* and maintains symmetry along the axis of the substrate. Specifically, the third microstrip line 212*c* and the pair of second radiator arms 212*b* may both have a certain inclination so as to form a radiator structure like a "π" pattern with the second radiator body 212*a* on one side of the axis of the substrate. Thus, the second radiator 212 as a whole has a radiator structure similar to a double "π" pattern.

In a preferred embodiment, the third microstrip line 212*c* extending to the end of the root of the substrate can be used, and a width w1 of the third microstrip line 212*c* is made greater than a width w2 of the pair of second radiator arms 212*b* to improve coverage of the signals with a low band frequency by the antenna.

In other embodiments, with reference to FIG. 1 again, the antenna may, in addition to the first radiation portion, include a second radiation portion 22 including a fourth radiator 221 and a fifth radiator 222.

A frequency band corresponding to the second radiation portion 22 is different from the frequency band corresponding to the first radiation portion 21, and the second radiation portion 22 corresponds to a higher second frequency band. Thus, it is possible to cover a high frequency band by the second radiation portion and a low frequency band by the first radiation portion, thereby obtaining a dual frequency antenna.

Of course, the first frequency band corresponding to the first radiation portion 21 and the second frequency band corresponding to the second radiation portion 22 can be set as required by the actual situation, and are not limited to specific frequency bands. The terms "first" and "second" are used only to distinguish between the frequency bands corresponding to or covered by the two radiation portions, meaning the relative level of frequencies between the two.

Here, the fourth radiator 221 and the fifth radiator 222 may adopt a dipole structure which is symmetrically disposed and has opposite orientations. The fourth radiator 221 faces one end of the head of the substrate, and the fifth radiator 222 faces one end of the root of the substrate, and the fourth radiator 221 and the fifth radiator 222 are symmetrically disposed along a straight line where the radial direction of the substrate lies.

Specifically, the fourth radiator 221 may be composed of a fourth radiator main body 221*a* and a pair of fourth radiator arms 221*b* formed at both ends of the fourth radiator so as to extend in the axial direction of the substrate to form a U-shaped radiator structure. The fifth radiator 222 adopts a symmetrical structure with respect to the fourth radiator 221, and a description thereof will not be repeated here for simplicity of presentation.

The feed lines (31, 32) are lines connecting the "radiation portions" with other signal processing systems to form a signal transmission passage. In particular, any suitable type of wire having sufficient shielding and signal transmission properties (like an axis) may be used. In some embodiments, corresponding to the two radiation portions, two feed lines may also be provided as a first feed line 31 and a second feed line 32 for transmitting a low-frequency band signal and a high-frequency band signal, respectively, running on the first surface A and the second surface B of the substrate 10.

As shown in FIG. 1, the feed lines (31, 32) generally need to extend a certain length in the direction of the root of the substrate, starting from the position where they are connected with the radiation portions, until they leave the substrate 10. In other words, the feed line 30 will pass or travel on the surface of the substrate. "Travel" refers to the situation where the feed lines (31, 32) pass or pass at a distance from the surface of the substrate 10.

When the feed lines (31, 32) transmit signals, they may affect or interfere with the resonant signals of the radiation portions of the surface of the substrate which they pass. In a preferred embodiment, the interference caused by the transmission of signals by the feed lines (31, 32) can be reduced as much as possible by providing the pad 40.

With continued reference to FIG. 1, the pad 40 is a filling structure disposed between the feed lines (31, 32) and the surface of the substrate. It has a predetermined size, the pad being below the feed line so that the feed line 30 remains at a sufficient distance from the surface of the substrate.

In this embodiment, "dimension" refers to a combination of parameters (e.g. thickness, width, or length) associated with a profile of the pad to characterize the external profile of the filling structure, and the particular parameters involved may be determined based on the actual selected profile of the pad 40 or the desired distance of the feed lines (31, 32) from the surface of the substrate.

The above-mentioned predetermined dimension is an empirical value, which can be determined by a person skilled in the art as required by the actual situation, and only needs to be able to keep the feed lines (31, 32) at a sufficient distance from the substrate.

The distance between the feed lines (31, 32) and the substrate may be characterized or measured by one or more parameters. For example, a vertical distance between the feed lines (31, 32) and the surface of the substrate may be used.

This vertical distance is an empirical value and only needs to be sufficient for use. A person skilled in the art would have been able to predetermine a minimum standard or a suitable standard to be satisfied by the vertical distance between the feed lines (31, 32) and the surface of the substrate as required by the actual situation (such as performance indicators and experimental results), and then choose to use a pad with a corresponding size.

In particular, the pad 40 may be made of any suitable type of non-conductive material, including but not limited to foam, plastic, and wood, as a structure to bed the feed line. In view of the different materials of construction specifically used for the pad 40, corresponding structures may also be used. For example, when foam is used, the pad 40 may be a foam layer having a certain thickness (e.g. foam with a thickness of 0.5 mm), and when wood or plastic is used, a wood frame or a plastic frame having a shape structure adapted to the feed lines (31, 32) may be selected as the pad 40.

In other embodiments, in order to avoid relative movement between the feed lines (31, 32) and the substrate 10 and the pad 40 during daily use of the antenna, the feed lines (31, 32) may be fixed to the pad 40 by any suitable type of fixing means (e.g. pasting fixation or bundling fixation), keeping the substrate 10, the pad 40 and the feed line 30 integrally fixed.

Figure 3:
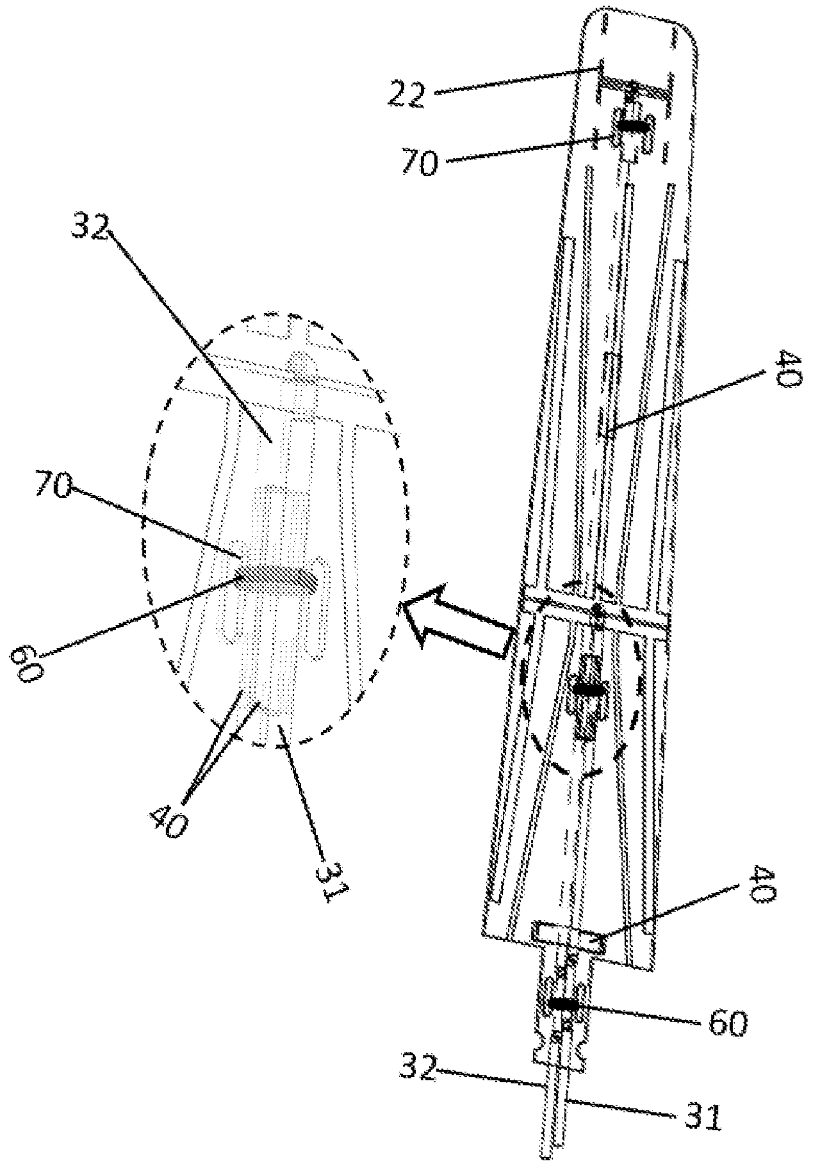
FIG. 3 is a side view of the antenna according to an embodiment of the present disclosure.

Specifically, as shown in FIG. 3, when the bundling fixation is used, the feed lines (31, 32) and the pad 40 can be bundled and fixed on the substrate 10 by means of a rope form of a hemp rope 60 or the like at intervals of distance, through a hollowing groove 70 or other likewise holes disposed on the substrate 10.

In particular, a suitable quantity of hemp ropes 60 may be disposed according to distance or length that the feed line 30 travels on the substrate 10. Of course, other non-conductive bundling materials (e.g. plastic strapping) that do not interfere with the reception or transmission of signals by the antenna may also be used.

However, in the case of using the pasting fixation, the feed lines (31, 32), the pad 40 and the substrate 10 may be paste-fixed by an adhesive having a paste force such as an appropriate type of glue or adhesive tape. Of course, the above-mentioned pasting fixation and bundling fixation may also be used in combination and not necessarily independently. For example, the pad 40 may be pasted and fixed to the substrate 10, and the feed lines (31, 32) may be bundled and fixed to the pad 40.

In the antenna structure disposed in the embodiments of the present disclosure, by arranging a filling structure with a reasonable size between the feed lines (31, 32) and the surface of the substrate to heighten the feed lines (31, 32) so as to ensure that the feed lines (31, 32) traveling on the substrate keep a certain distance from the surface of the substrate, the effect of reducing the influence or interference of the feed lines (31, 32) on a resonant wave (such as a high-frequency signal or a low-frequency signal corresponding to the above-mentioned radiation portions) during signal transmission can be achieved, which is beneficial for improving the overall performance of the antenna.

It should be noted that the antenna shown in FIG. 1 is merely for illustrative purposes, and one skilled in the art may add, adjust, replace, or subtract one or more functional components as the actual situation requires, and the solution is not limited to that shown in FIG. 1. The technical features involved in the embodiment of the antenna shown in FIG. 1 can be combined with each other as long as they do not constitute a conflict, and can be applied independently in different embodiments as long as they do not constitute a dependency.

Embodiments of the present disclosure provide a specific example of a dual frequency antenna that can operate in both the 900 MHz and 5.8 GHz frequency bands.

As shown in FIG. 1, the dual-frequency antenna includes: a substrate 10, a first radiator 211, a second radiator 212, a third radiator 213, a fourth radiator 221, a fifth radiator 222, a sixth radiator 233, a first feed line 31, a second feed line 32 and a pad 40.

The first radiator 211 adopts a radiator shape similar to a "山" shape as a whole, and a pair of inclined microstrip lines are newly added on the radiator shape of the "ı|ı" shape. The second radiator 212 takes the shape of a radiator formed by superposition of two "π" characters, and the effective length of the first radiator is slightly greater than the effective length of the second radiator.

The third radiator 213 is disposed on the back side and has a radiator shape like a "π" form (which is mirror symmetry with a portion of the first radiator 211). The third radiator 213 communicates with the second radiator 212 and belongs to the same passage.

The first feed line 31 uses a coaxial line, the first radiator 211 is connected with an inner conductor of the coaxial line 31, and the passage where the second radiator 212 and the third radiator 213 are located is connected with an outer conductor of the coaxial line 31. The first feed line 31 traveling on the front side of the substrate 10 is fixed on the substrate 10 by means of a hemp rope bundling. A foam layer with a thickness of 0.5 mm is disposed between the first feed line 31 and the substrate 10 to ensure that a sufficient distance is maintained between the first feed line 31 and the first surface A.

The first radiator 211, the second radiator 212 and the third radiator 213 constitute a coupled resonance point, and as a first radiation portion, correspond to a low frequency band (900 MHz), providing a large low frequency bandwidth.

The fourth radiator 221 and the fifth radiator 222 are also disposed on the back side of the substrate, and constitute a second radiation portion to cover the high frequency band (5.8 GHz). The fourth radiator 221 and the fifth radiator 222 each adopt a "U"-shaped radiator structure, and a total length of the sizes of the two radiators is controlled within a range of ⅛ to ¾ of a high-frequency resonance wavelength.

The second feed line 32 travels on the back side of the substrate 10 and is likewise coaxial. The fourth radiator 221 is connected with an inner conductor of the coaxial line 32 and the fifth radiator 222 is connected with an outer conductor of the coaxial line 32. Similar to the first feed line 31, the second feed line 32 is also fixed to the substrate 10 in a bundling fixation by means of a plurality of sets of hemp ropes passing through the substrate 10, and a foam layer with a thickness of 0.5 mm is likewise disposed between the second surface B of the substrate 10 and the second feed line 32 to ensure a distance between the second feed line 32 and the second surface B.

Alternatively, the antenna further includes a fourth radiator and a fifth radiator disposed on the second surface; and the fourth radiator and the fifth radiator are symmetrically disposed and have opposite orientations, and the fourth radiator is oriented towards one end of the head of the substrate.

Alternatively, the feed line includes a first feed line and a second feed line;

the first feed line runs on the first surface of the substrate and is connected with the first radiator, the second radiator and the third radiator; and the second feed line runs on the second surface of the substrate and is connected with the fourth radiator and the fifth radiator.

Alternatively, the first feed line and the second feed line are coaxial lines;

the first radiator is connected with an inner conductor of the first feed line, and the second radiator and the third radiator form a passage and are connected with an outer conductor of the first feed line; and the fourth radiator is connected with an inner conductor of the second feed line, and the fifth radiator is connected with an outer conductor of the second feed line.

Alternatively, the first radiator and the second radiator are disposed symmetrically along an axial direction of the substrate.

Alternatively, a difference between an effective length of the first radiator and an effective length of the second radiator is greater than zero and less than a predetermined length threshold.

Alternatively, the first radiator further includes:

a first radiator body having a predetermined length extending in a radial direction of the substrate;

a pair of first radiator arms respectively formed at two ends of the first radiator body and extending in an axial direction of the substrate;

a first microstrip line disposed on an axis of symmetry of the first radiator, a length of the first microstrip line being greater than a length of the radiator arms and the first microstrip line being in communication with the radiator main body; and a pair of second microstrip lines disposed between the first microstrip line and the first radiator arms, a length of the pair of second microstrip lines being greater than a length of the first microstrip line and the pair of second microstrip lines being in communication with the radiator main body.

Alternatively, the third radiator is mirror symmetric with the first radiator body and the pair of the second microstrip lines.

Alternatively, the second radiator further includes:

a second radiator body having a predetermined length extending in a radial direction of the substrate;

a pair of second radiator arms, being formed extending in an axial direction of the substrate at a position near an end of the second radiator body; and a pair of third microstrip lines disposed between the pair of second radiator arms.

Alternatively, the pair of third microstrip lines extend to one end of the root of the substrate; and a width of the pair of third microstrip lines is greater than a width of the pair of second radiator arms.

Alternatively, the fourth radiator includes: a fourth radiator body and a pair of fourth radiator arms formed by two ends of the fourth radiator extending in an axial direction of the substrate.

Alternatively, the first radiator, the second radiator and the third radiator constitute a first radiation portion, and the fourth radiator and the fifth radiator constitute a second radiation portion; and the first radiation portion corresponds to a first frequency band; the second radiation portion corresponds to a second frequency band and has a dimension length of between ⅛ and ¾ of a resonance wavelength of the second frequency band; the first frequency band has a higher frequency than the second frequency band.

Alternatively, the first frequency band is a 900 MHz frequency band and the second frequency band is a 5.8 GHz frequency band.

Alternatively, the antenna further includes: a pad having a predetermined size, and the pad is disposed between the feed line and the substrate to maintain the feed line at a distance from the substrate.

Alternatively, the pad includes: a foam layer, a plastic rack or a wood rack.

Figure 4:
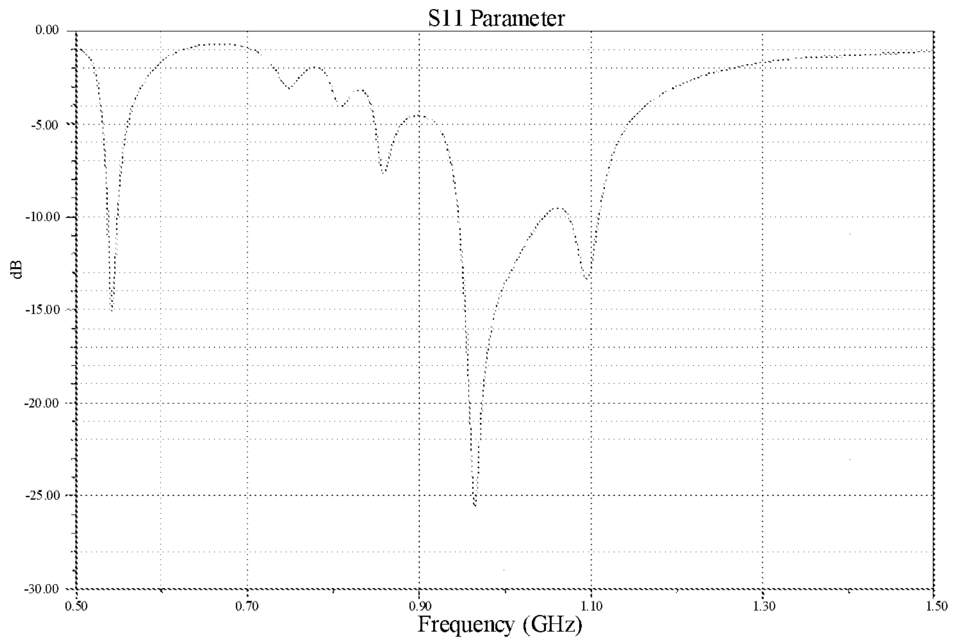
FIG. 4 is a schematic diagram of a low frequency S parameter of the antenna according to an embodiment of the present disclosure.
Figure 5:
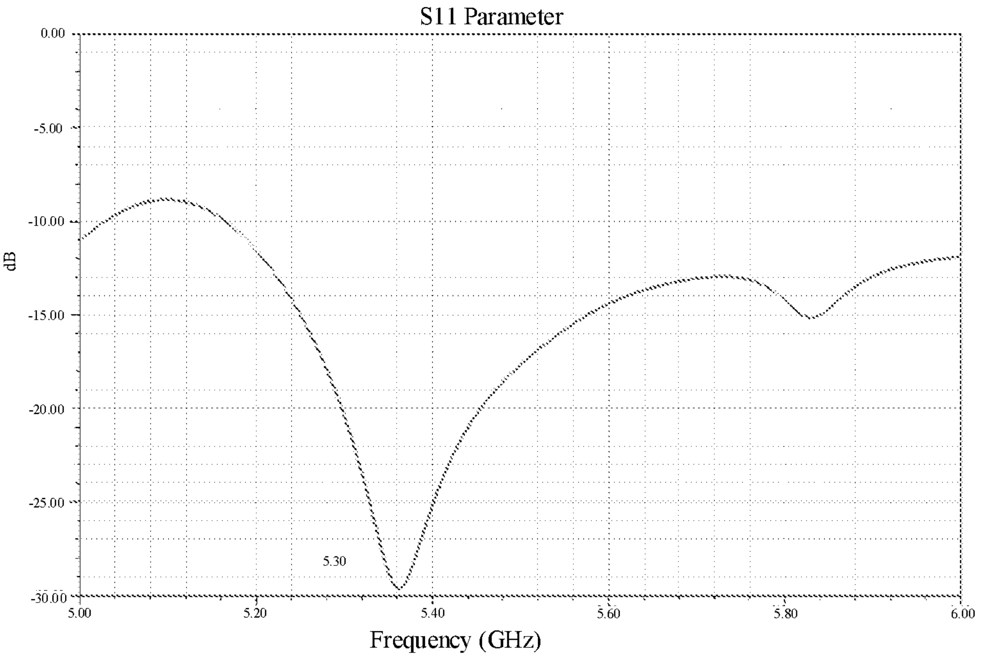
FIG. 5 is a schematic diagram of a high frequency S parameter of the antenna according to an embodiment of the present disclosure.

Alternatively, a fixing means for fixing the feed line and the pad on the substrate includes: bundling fixation or pasting fixation. FIG. 4 is a schematic diagram of S parameter at a low frequency band of the antenna according to an embodiment of the present disclosure. FIG. 5 is a schematic diagram of S parameter at a high frequency band of the antenna according to an embodiment of the present disclosure.

As shown in FIGS. 4 and 5, the antenna provided by the above-mentioned embodiment can operate at 0.94 GHz-1.11 GHz (low frequency band) and 5.18 GHz-6.0 GHz (high frequency band). Thus, coverage can be achieved for both the 900 MHz (17.8%) and 5.8 GHz frequency bands.

Figure 6:
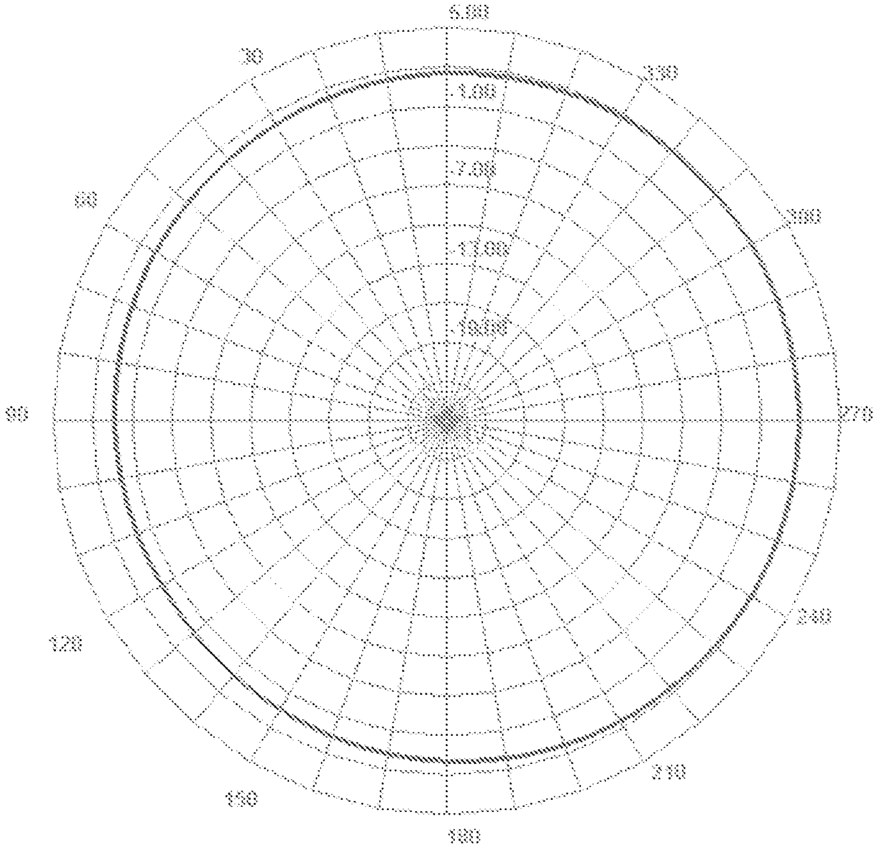
FIG. 6 is a directional view of the antenna in a low frequency band according to an embodiment of the present disclosure.
Figure 7:
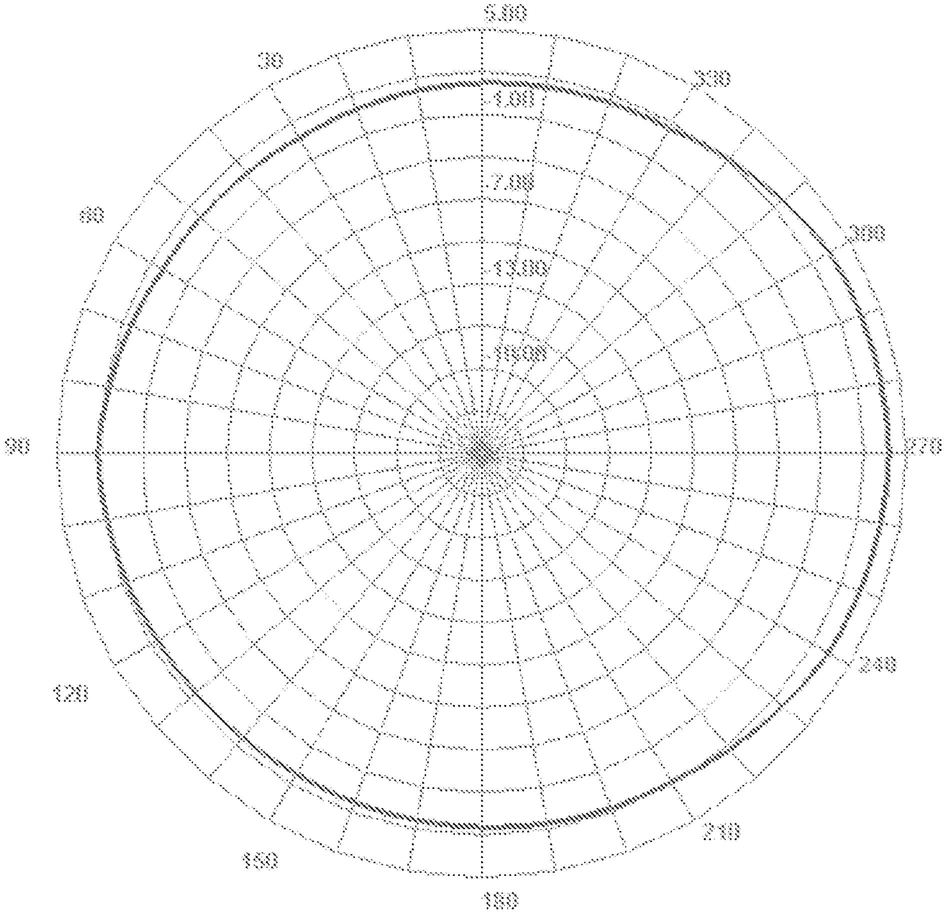
FIG. 7 is a directional view of the antenna in a high frequency band according to an embodiment of the present disclosure.

FIG. 6 and FIG. 7 are directional views of the antenna in the low frequency band and the high frequency band according to the embodiment of the present disclosure; As shown in FIGS. 6 and 7, the antenna disposed by the embodiment of the present disclosure has good directivity, good omnidirectivity and no defect in a specific direction in both the low frequency band and the high frequency band.

An embodiment of the present disclosure still further provides a wireless signal processing device based on the antenna disposed in the above-mentioned embodiments. The present embodiment is not limited to a specific implementation of the wireless signal processing device, and may be any type or kind of electronic device for wireless signal transceiving, such as a remote controller, an intelligent terminal, a wearable device, or a signal transceiver of a mobile carrier.

Figure 8:
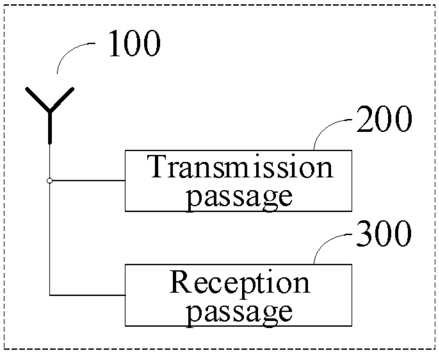
FIG. 8 is a schematic diagram of a wireless signal processing device according to an embodiment of the present disclosure.

FIG. 8 is a schematic structural diagram of a wireless signal processing device according to an embodiment of the present disclosure. As shown in FIG. 8, the wireless signal processing device includes: an antenna 100, a transmission passage 200, and a reception passage 300. The antenna 100 is connected with the reception passage 200 or the transmission passage 300 through a feed line to realize signal transmission with each other.

The antenna 100 may be embodied as described in one or more of the above-mentioned embodiments, depending on the particular implementation of the wireless signal processing device. For example, the antenna 100 may be an omnidirectional antenna covering two frequency bands.

The transmission passage 200 is a functional module for loading information content to be transmitted into a carrier signal to form a wireless signal. It can be embodied in any type of electronic system, formed by a combination of one or more electronic elements, that can generate wireless signals, such as a radio frequency chip.

The reception passage 300 is an electronic system, such as a particular model of decoding chip, for parsing the wireless signal received by the antenna to obtain the information content contained in the wireless signal. It has an opposite information flow direction to the transmission passage 200, and is a functional module for completing information acquisition.

In some embodiments, based on different specific implementations of the wireless signal processing device, one of the transmission passage 200 and the reception passage 300 may be obviated. For example, when the wireless signal processing device is a remote control, the reception passage 300 may be omitted, and only the transmission passage 200 may be disposed.

Figure 9:
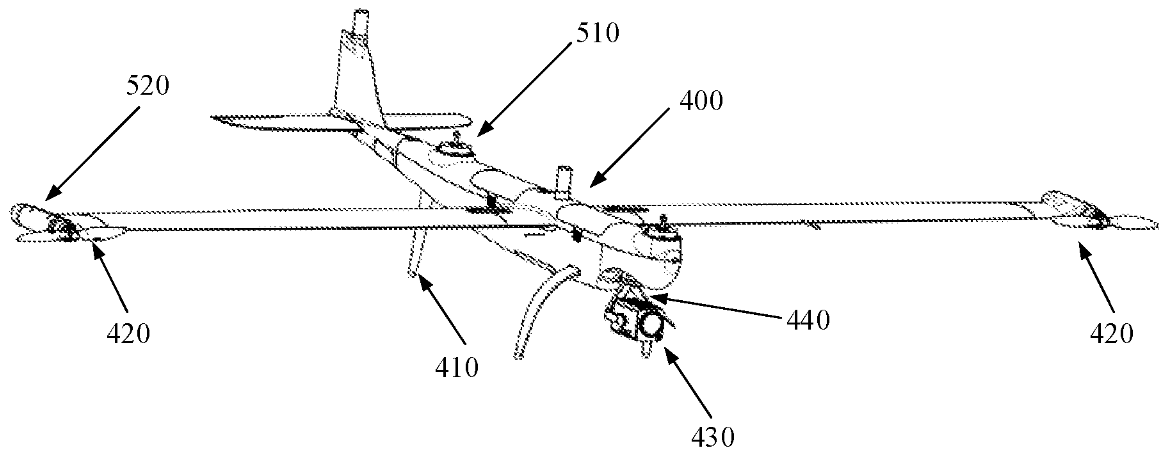
FIG. 9 is a schematic diagram of the antenna according to an embodiment of the present disclosure in an application scenario of an unmanned aerial vehicle.

Embodiments of the present disclosure still further provide application scenarios for the antenna disposed by the above-mentioned embodiments. FIG. 9 is a schematic structural diagram of an antenna used in an unmanned aerial vehicle according to an embodiment of the present disclosure.

With the development of unmanned aerial vehicle technology, it is always desirable to reduce the fuselage volume of unmanned aerial vehicles as much as possible so that unmanned aerial vehicles can be adapted to perform missions in more scenes. However, in the case of a reduced volume of the fuselage of the unmanned aerial vehicle, higher demands are placed on the size and structure of the antenna, which is expected to be possible in a limited volume and as simple a structure as possible.

Thus, with the antenna disposed by embodiments of the present disclosure, the requirements of an unmanned aerial vehicle having a smaller fuselage with respect to the volume and structure of the antenna can be well met. As shown in FIG. 9, the unmanned aerial vehicle may include: a fuselage 400, motors (510, 520), and an antenna.

As the main structure of the unmanned aerial vehicle, the fuselage 400 may be made of any suitable material and have a structure and size suitable for use (such as the fixed wing unmanned aerial vehicle shown in FIG. 9). A variety of different functional components may be disposed on the fuselage 400, such as landing gear 410, a propeller 420, a camera 430, etc. Of course, a person skilled in the art would also have been able to add or omit one or more functional components as required by the actual situation. For example, a corresponding pan-tilt 440 can be added to the camera 430.

The motors (510, 520) are mounted to the fuselage 400 for providing flight power to the unmanned aerial vehicle. The motor may be provided with one or more motors disposed at corresponding positions of the fuselage 400 (e.g. a fuselage motor 510, a wingtip motor 520) for performing different functions (e.g. driving rotation of the propeller 420, controlling posture of the fuselage, etc.).

The antenna may be mounted and housed within the landing gear 410 (e.g. within a rear landing gear shown in FIG. 9 and designated by reference numeral 410) as part of a wireless signal transceiving device for receiving remote control operation instructions from a remote control or for feeding back relevant data information (e.g. captured images, operational status parameters of the unmanned aerial vehicle itself) to a remote control or other intelligent terminal.

Of course, based on the application scenarios of the unmanned aerial vehicle disposed by the embodiments, a person skilled in the art could also apply the antenna disposed by the above-mentioned embodiments to other similar unmanned mobile carriers, not limited to the unmanned aerial vehicle shown in FIG. 9.

Finally, it should be noted that: the above embodiments are merely illustrative of the technical solutions of the present disclosure, rather than limiting it; combinations of features in the above embodiments or in different embodiments are also possible within the spirit of the disclosure, the steps can be implemented in any order, and there are many other variations of the different aspects of the disclosure described above, which are not provided in detail for the sake of brevity; although the present disclosure has been described in detail with reference to the foregoing embodiments, those skilled in the art will appreciate that: the technical solutions disclosed in the above-mentioned embodiments can still be amended, or some of the technical features thereof can be replaced by equivalents; such modifications and substitutions do not depart from the spirit and scope of the embodiments of the present disclosure.

What is claimed is:

1. An antenna, comprising:

a substrate having a first surface and a second surface opposite the first surface;

a first radiator and a second radiator disposed on the first surface, the first radiator and the second radiator facing opposite each other, the first radiator being located at one end near a head of the substrate, and the second radiator being located at one end near a root of the substrate;

a third radiator disposed on the second surface, the third radiator being mirror symmetric with a portion of a structure of the first radiator and conducting with the second radiator, so that the first radiator, the second radiator and the third radiator form a coupled resonance point; and one or more feed lines connected with the first radiator, the second radiator and the third radiator.

2. The antenna according to claim 1, further comprising: a fourth radiator and a fifth radiator disposed on the second surface;

the fourth radiator and the fifth radiator being symmetrically disposed and having opposite orientations, and the fourth radiator being oriented towards one end of the head of the substrate.

3. The antenna according to claim 2, wherein the feed lines comprise a first feed line and a second feed line;

the first feed line runs on the first surface of the substrate and is connected with the first radiator, the second radiator and the third radiator; and the second feed line runs on the second surface of the substrate and is connected with the fourth radiator and the fifth radiator.

4. The antenna according to claim 3, wherein the first feed line and the second feed line are coaxial;

the first radiator is connected with an inner conductor of the first feed line, and the second radiator and the third radiator form a passage and are connected with an outer conductor of the first feed line; and the fourth radiator is connected with an inner conductor of the second feed line, and the fifth radiator is connected with an outer conductor of the second feed line.

5. The antenna according to claim 4, wherein the first radiator comprises:

a first radiator body having a predetermined length extending in a radial direction of the substrate;

a pair of first radiator arms respectively formed at two ends of the first radiator body and extending in an axial direction of the substrate;

a first microstrip line disposed on an axis of symmetry of the first radiator, a length of the first microstrip line being greater than a length of the pair of first radiator arms and the first microstrip line being in communication with the first radiator body; and a pair of second microstrip lines disposed between the first microstrip line and the pair of first radiator arms, a length of the pair of second microstrip lines being greater than a length of the first microstrip line and the pair of second microstrip lines being in communication with the first radiator body.

6. The antenna according to claim 5, wherein the third radiator is mirror symmetric with the first radiator body and the pair of second microstrip lines.

7. The antenna according to claim 4, wherein the second radiator comprises:

a second radiator body having a predetermined length extending in a radial direction of the substrate;

a pair of second radiator arms, being formed extending in an axial direction of the substrate at a position near an end of the second radiator body; and a pair of third microstrip lines disposed between the pair of second radiator arms.

8. The antenna according to claim 7, wherein the pair of third microstrip lines extends to one end of the root of the substrate; and a width of the pair of third microstrip lines is greater than a width of the pair of second radiator arms.

9. The antenna according to any of claim 2, wherein the fourth radiator comprises: a fourth radiator body and a pair of fourth radiator arms formed by two ends of the fourth radiator extending in an axial direction of the substrate.

10. The antenna according to any one of claim 2, wherein the first radiator, the second radiator and the third radiator constitute a first radiation portion, and the fourth radiator and the fifth radiator constitute a second radiation portion; and the first radiation portion corresponds to a first frequency band; the second radiation portion corresponds to a second frequency band and has a dimension length of between ⅛ and ¾ of a resonance wavelength of the second frequency band; the first frequency band has a higher frequency than the second frequency band.

11. The antenna according to claim 10, wherein the first frequency band is a 900 MHz frequency band and the second frequency band is a 5.8 GHz frequency band.

12. The antenna according to claim 1, wherein the first radiator and the second radiator are disposed symmetrically along an axial direction of the substrate.

13. The antenna according to claim 1, wherein a difference between an effective length of the first radiator and an effective length of the second radiator is greater than zero and less than a predetermined length threshold.

14. The antenna according to claim 1, wherein the antenna further comprises: a pad having a predetermined size, and the pad is disposed between the feed line and the substrate to maintain the feed line at a distance from the substrate.

15. The antenna according to claim 14, wherein the pad comprises: a foam layer, a plastic rack, or a wood rack.

16. The antenna according to claim 14, wherein a fixing means for fixing the feed line and the pad on the substrate comprises: bundling fixation or pasting fixation.

17. A wireless signal processing device, comprising:

an antenna for transmitting or receiving a wireless signal; and a transmission passage for loading information content into a radio frequency carrier signal, forming a wireless signal and transmitting the wireless signal via the antenna;

wherein the antenna comprises:

a substrate having a first surface and a second surface opposite the first surface;

a first radiator and a second radiator disposed on the first surface, the first radiator and the second radiator facing opposite each other, the first radiator being located at one end near a head of the substrate, and the second radiator being located at one end near a root of the substrate;

a third radiator disposed on the second surface, the third radiator being mirror symmetric with a portion of a structure of the first radiator and conducting with the second radiator, so that the first radiator, the second radiator and the third radiator form a coupled resonance point; and one or more feed lines connected with the first radiator, the second radiator and the third radiator.

18. An unmanned aerial vehicle, comprising:

a fuselage having a landing gear thereon;

a motor mounted on the fuselage for providing flight power for the unmanned aerial vehicle; and an antenna mounted within the landing gear;

wherein the antenna comprises:

a substrate having a first surface and a second surface opposite the first surface;

a first radiator and a second radiator disposed on the first surface, the first radiator and the second radiator facing opposite each other, the first radiator being located at one end near a head of the substrate, and the second radiator being located at one end near a root of the substrate;

a third radiator disposed on the second surface, the third radiator being mirror symmetric with a portion of a structure of the first radiator and conducting with the second radiator, so that the first radiator, the second radiator and the third radiator form a coupled resonance point; and one or more feed lines connected with the first radiator, the second radiator and the third radiator.

* * * * *